(12) United States Patent
Palaniappan et al.

(10) Patent No.: US 10,073,871 B2
(45) Date of Patent: Sep. 11, 2018

(54) DATABASE ENTITY ANALYSIS

(71) Applicant: International Business Machines Corporation, Armonk, NY (US)

(72) Inventors: Subramanian Palaniappan, Trichy (IN); Sushain Pandit, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 331 days.

(21) Appl. No.: 14/935,597

(22) Filed: Nov. 9, 2015

(65) Prior Publication Data

US 2017/0132289 A1   May 11, 2017

(51) Int. Cl.
  *G06F 17/30* (2006.01)

(52) U.S. Cl.
  CPC .............. *G06F 17/30303* (2013.01)

(58) Field of Classification Search
  CPC .................................. G06F 17/30303
  See application file for complete search history.

(56) References Cited

U.S. PATENT DOCUMENTS

| | | |
|---|---|---|
| 6,289,334 B1 | 9/2001 | Reiner et al. |
| 6,571,233 B2 | 5/2003 | Beavin et al. |
| 7,558,785 B2 | 7/2009 | Dettinger et al. |
| 7,882,120 B2 | 2/2011 | Box et al. |
| 8,682,923 B2 | 3/2014 | He |
| 8,924,388 B2 | 12/2014 | Elliot et al. |
| 8,930,386 B2 | 1/2015 | Mayr et al. |
| 2010/0121868 A1 | 5/2010 | Biannic et al. |
| 2011/0314010 A1 | 12/2011 | Ganti et al. |
| 2013/0007126 A1* | 1/2013 | Ziemann ............... G06Q 50/01 709/204 |
| 2014/0149106 A1* | 5/2014 | Beretta ................ G06F 17/273 704/9 |
| 2015/0012561 A1 | 1/2015 | Kirchoff |
| 2015/0142829 A1 | 5/2015 | Lee et al. |

FOREIGN PATENT DOCUMENTS

CN    102156740 A    8/2011

OTHER PUBLICATIONS

Altwaijry, et al, "Query-Driven Approach to Entity Resolution", Proceedings of the VLDB Endowment, vol. 6, No. 14. Aug. 26-30, 2013, Riva del Garda, Trento, Italy. pp. 1846-1857.
Li, et al., "Set Predicates in SQL: Enabling Set-Level Comparisons for Dynamically Formed Groups", IEEE Transactions on Knowledge and Data Engineering, vol. 26, No. 2, Feb. 2014. pp. 438-452.
Song, et al., "On Concise Set of Relative Candidate Keys", 40th International Conference on Very Large Data Bases, Sep. 1-5, 2014, Hangzhou, China. Proceedings of the VLDB Endowment, vol. 7, No. 12. pp. 1179-1190.

* cited by examiner

*Primary Examiner* — Hung Q Pham
(74) *Attorney, Agent, or Firm* — Stosch Sabo

(57) ABSTRACT

A first entity and a second entity can be retrieved from a database and compared. The first entity and the second entity can each comprise at least one respective primary key, at least one respective attribute, and at least one pair of corresponding instances. One or more equivalent attributes can be identified, and, for each equivalent attribute, a set of attribute value differences can be compiled for each respective corresponding instance between the first entity and the second entity.

12 Claims, 5 Drawing Sheets

DATABASE ENTITY ANALYSIS

BACKGROUND

The present disclosure relates to data comparison, and more specifically, to identifying equivalent properties in two or more sets of data and determining changes between corresponding equivalent property values of the two or more sets of data.

SUMMARY

Aspects of the present disclosure include a method for analyzing large sets of data. The method can comprise receiving a first entity and a second entity. The first entity and the second entity can each comprise a respective set of data stored in a database. The first entity and the second entity can each comprise at least one respective primary key and at least one respective attribute. The first entity and the second entity can comprise at least one pair of corresponding instances. Each respective instance can comprise a respective primary key value and at least one respective attribute value. The method can further comprise matching at least one respective attribute of the first entity to a respective equivalent attribute of the second entity. The method can further comprise executing a database query to identify zero or more attribute value differences between the at least one pair of corresponding instances. The method can further comprise producing a user consumable output which indicates the zero or more attribute value differences identified via the database query.

Further aspects of the present disclosure include a system for analyzing large sets of data. The system can comprise a memory storing a database comprising a plurality of entities. Each entity can be associated with a primary key, at least one property, and a plurality of instances. Each instance can comprise a unique primary key value and at least one property value. The system can further comprise an interface configured to receive one or more inputs and display one or more outputs. The system can further comprise a processing unit communicatively coupled to the memory and the interface and configured to retrieve at least a first entity and a second entity from the memory. The processing unit can be further configured to match at least one respective property of the first entity to a respective equivalent property of the second entity. The processing unit can be further configured to perform a database query identifying differences in at least one property value between at least one instance of the first entity and a corresponding instance of the second entity. The processing unit can be further configured to produce a user consumable output which indicates zero or more attribute value differences identified via the database query.

Further aspects of the present disclosure can include a computer program product comprising a computer readable storage medium having program instructions. The program instructions can be executed by a processor and can cause the processor to retrieve a first set of data and a second set of data. Each set of data can comprise a plurality of instances. Each instance can comprise a respective identifier value and at least one respective attribute value. Each respective attribute value can correspond to a respective attribute type and a respective identifier. The program instructions can be further configured to further cause the processor to match at least one respective attribute type of the first set of data to a respective equivalent attribute type of the second set of data. The program instructions can be further configured to further cause the processor to determine a set of attribute value differences between at least one attribute value of at least one instance of the first set of data and a corresponding attribute value of a corresponding instance of the second set of data. The program instructions can be further configured to further cause the processor to compile the set of attribute value differences in a data object.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
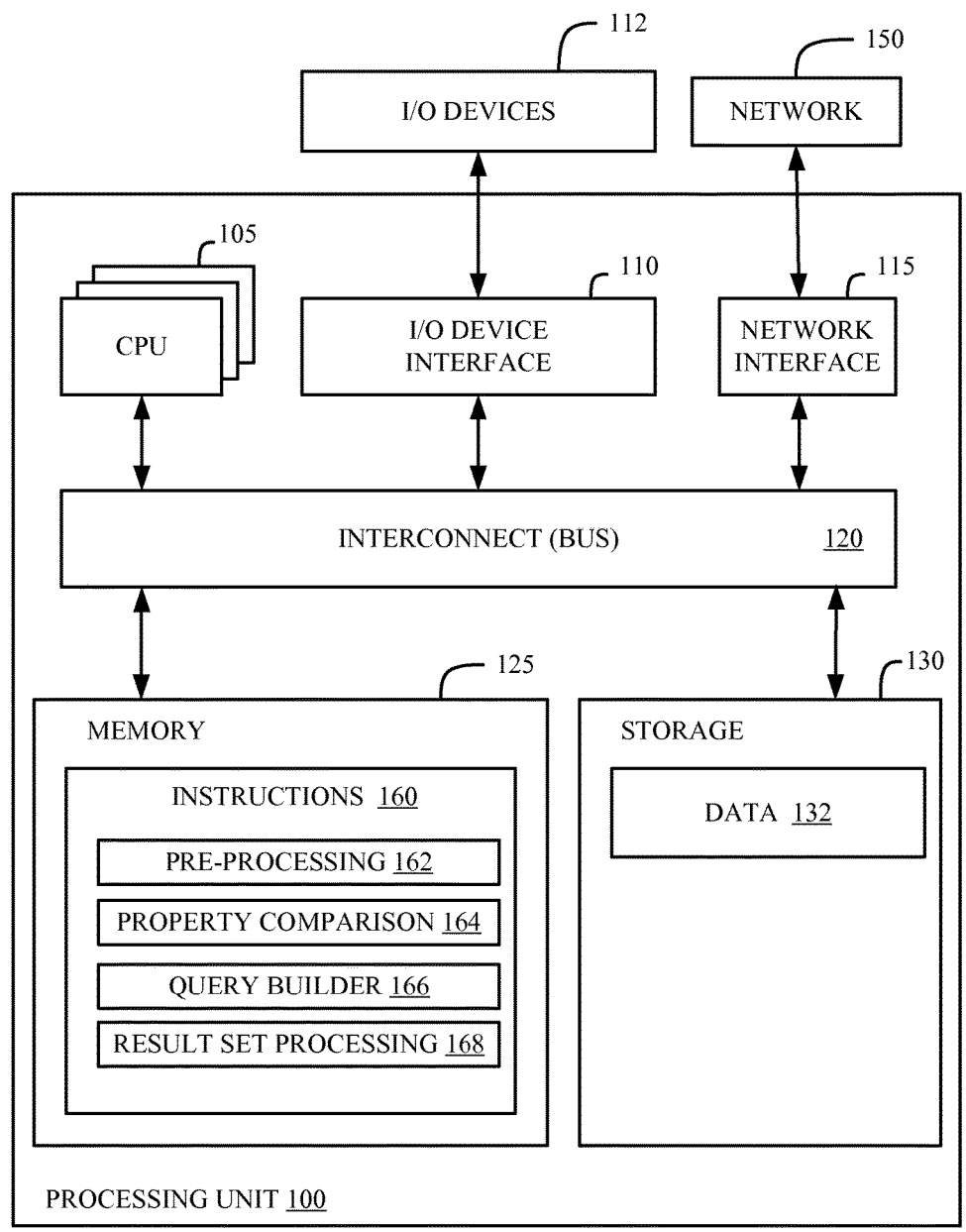
FIG. 1 illustrates a block diagram of a processing unit in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to data comparison. More particular aspects relate to identifying equivalent properties in two or more sets of data and determining changes between corresponding equivalent property values of the two or more sets of data. Although not limited to such applications, an understanding of some embodiments of the present disclosure may be improved given the context of normalizing and comparing data.

Aspects of the present disclosure include identifying various additions, deletions, and updates occurring between corresponding values of two sets of data. According to various embodiments of the present disclosure, corresponding values can be identified using set intersection techniques, and the identified corresponding values can then be compared for changes using query predicate searches. Additional aspects of the present disclosure can identify equivalent properties (e.g., attributes) between a plurality of sets of data using syntactic comparisons and semantic searches (e.g., aspects of the present disclosure can determine that two attribute titles such as {client_name} and {client} can refer to the same data, and, thus, corresponding instances of the two attributes can be compared).

Aspects of the present disclosure can provide numerous advantages. Firstly, aspects of the present disclosure can identify corresponding instances of two or more entities and compare the corresponding instances using database queries. In so doing, performance can be enhanced by reducing memory requirements and performance bottlenecks. Furthermore, database queries can be beneficial to efficiently analyzing dynamic databases (e.g., databases having compound keys). Thus, aspects of the present disclosure are scalable to large sets of data and complex sets of data (e.g., sets of data having compound keys and composite keys).

Secondly, aspects of the present disclosure can identify semantically equivalent, non-identical properties between two or more entities. For example, a first set of data can refer to {Client_Name, Client_Location, Client_Industry} while a second set of data can refer to the same clients according to {Client, Location, Industry}. Aspects of the present disclosure can determine {Client_Name} is equivalent to {Client} despite the differences in naming conventions. Thus, aspects of the present disclosure can advantageously identify and compare entities that may have data types, names, or other properties that are non-identical but nonetheless semantically equivalent.

It should be understood that the advantages listed herein are example advantages and not every advantage is listed. Furthermore, some embodiments of the present disclosure can exhibit none, some, or all the advantages listed herein while remaining within the spirit and scope of the present disclosure.

For the purposes of the present disclosure, the term "entity" shall refer to a unique portion of data from a set of data (e.g., a database). Each entity can be associated with one or more properties such as, for example, one or more attributes. Thus, using the previously cited example of {Client, Location, Industry}, the {Client}, {Location} and {Industry} can refer to individual attributes. Each entity can have one or more instances. An instance can refer to a single record of populated attributes that are associated with the entity. An instance of the aforementioned example could be {ABC Company, ABC Location, ABC Industry}. Thus, an entity can refer to a set of instances populated by a set of attribute values.

As used in the present disclosure, "equivalent" attributes, properties, or other characteristics refer to said characteristics having semantically similar meanings despite syntactic differences. For example, {Client} and {Client_Name} can be equivalent. The term "value," as used herein, refers to a specific property of a specific instance. For example, the {Location} value for the instance {ABC Company} can be {ABC Location}. The term "corresponding," as used herein, refers to a similar aspect of a second entity in comparison to a first entity. In some cases, "corresponding" can refer to the value of a second entity having an equivalent attribute and an equivalent instance as a first entity. For example, the corresponding value to {ABC Location} from the {Client, Location, Industry} set of data is the value at the intersection of the attribute {Client_Location} of the instance {ABC Company} found in the set of data {Client_Name, Client_Location, Client_Industry}. In some cases, the corresponding value is the same (e.g., {ABC Location}) while in alternative cases the corresponding value is different (e.g., {ABC Location 2}). Differences in corresponding values can represent additions, deletions, or updates between the two data sets. In addition to "corresponding values," the present disclosure also uses the phrase "corresponding instances" which refer to a same or similar instance between two or more sets of data. Corresponding instances can be identified by an identical or equivalent primary key value between two or more entities. For example, the instance {ABC Company} can occur in both data sets {Client, Location, Industry} and {Client_Name, Client_Location, Client_Industry} under the equivalent attributes {Client} and {Client_Name}.

Furthermore, some aspects of the present disclosure refer to simple keys, compound keys, and primary keys. A "key," as used in this disclosure, refers to a structural aspect of a database. A "simple key" can be a single field that uniquely identifies a piece of data. A social security number could be one example of a simple key. A "compound key" can require more than one field to uniquely identify a record. A combination of "first name" and "last name" can comprise a compound key. A "primary key" can refer to a single key or a compound key that uniquely identifies each record (i.e., instance) in an entity and is appropriate as a reference name for the set of data. A primary key for the previous example can be {Client} in the event each instance contains a unique client name. Furthermore, in some cases, the primary key is used to reference an entity. Thus, the entity of the previous example can be referred to as {Client} since this title summarizes the purpose of the set of data and provides a unique identifier to each instance of the data.

Although aspects of the present disclosure are described with reference to two sets of data, any number of sets of data can be compared using the methods, systems, and products disclosed in the present disclosure. Furthermore, although aspects of the present disclosure are described with reference to databases (e.g., dynamic databases, entity attribute value databases), some aspects of the present disclosure can be relevant to other sets of data.

Referring now to the figures, FIG. 1 illustrates a block diagram of a processing unit in accordance with some embodiments of the present disclosure. In various embodiments, the processing unit 100 includes a memory 125, storage 130, an interconnect (e.g., BUS) 120, one or more processors (e.g., CPUs) 105, an I/O device interface 110, I/O devices 112, and a network interface 115.

Each processor 105 can be communicatively coupled to the memory 125 or storage 130. Each processor 105 can retrieve and execute programming instructions stored in the memory 125 or storage 130. In some embodiments, each processor 105 can execute methods as shown and described hereinafter with reference to FIGS. 2-3 and FIG. 5. The interconnect 120 is used to move data, such as programming instructions, between the CPU 105, I/O device interface 110, storage 130, network interface 115, and memory 125. The interconnect 120 can be implemented using one or more busses. The processors 105 can be a single CPU, multiple CPUs, or a single CPU having multiple processing cores in various embodiments. In some embodiments, a processor 105 can be a digital signal processor (DSP). Memory 125 is generally included to be representative of a random access memory (e.g., static random access memory (SRAM), dynamic random access memory (DRAM), or Flash). The storage 130 is generally included to be representative of a non-volatile memory, such as a hard disk drive, solid state device (SSD), removable memory cards, optical storage, or flash memory devices. In an alternative embodiment, the storage 130 can be replaced by storage area-network (SAN) devices, the cloud, or other devices connected to the processing unit 100 via the I/O device interface 110 or a communication network 150 via the network interface 115.

The network 150 can be implemented by any number of any suitable communications media (e.g., wide area network (WAN), local area network (LAN), Internet, Intranet, etc.). In certain embodiments, the network 150 can be implemented within a cloud computing environment or using one or more cloud computing services. In some embodiments, the network interface 115 communicates with both physical and virtual networks.

The processing unit 100 and the I/O devices 112 can be local to each other, and communicate via any appropriate local communication medium (e.g., local area network (LAN), hardwire, wireless link, Intranet, etc.) or they can be physically separated and communicate over a virtual network. In some embodiments, the I/O devices 112 can include a display unit capable of presenting information (e.g., a set of differences between two or more sets of data) to a user and receiving one or more inputs (e.g., two or more sets of data) from a user.

In some embodiments, the memory 125 stores instructions 160 while the storage 130 stores data 132. However, in various embodiments, the instructions 160 and the data 132 are stored partially in memory 125 and partially in storage 130, or they are stored entirely in memory 125 or entirely in storage 130, or they are accessed over a network 150 via the network interface 115.

The instructions 160 can store processor executable instructions for various methods such as the methods shown and described hereinafter with respect to FIGS. 2-3 and FIG. 5. The instructions 160 can contain pre-processing instructions 162 (described in further detail hereinafter with respect to operation 220 of FIG. 2), property comparison instructions 164 (described in further detail hereinafter with respect to FIG. 3), query builder instructions 166 (described in further detail hereinafter with respect to operation 240 of FIG. 2), and result set processing instructions 168 (described in further detail hereinafter with respect to operation 250 of FIG. 2). In some embodiments, the data 132 can comprise, in whole or in part, database data. The data 132 can, in some embodiments, contain two or more entities for comparison. Although data 132 is shown in storage 130, data 132 can also be accessed over a network 150 or retrieved from an I/O device 112.

Figure 2:
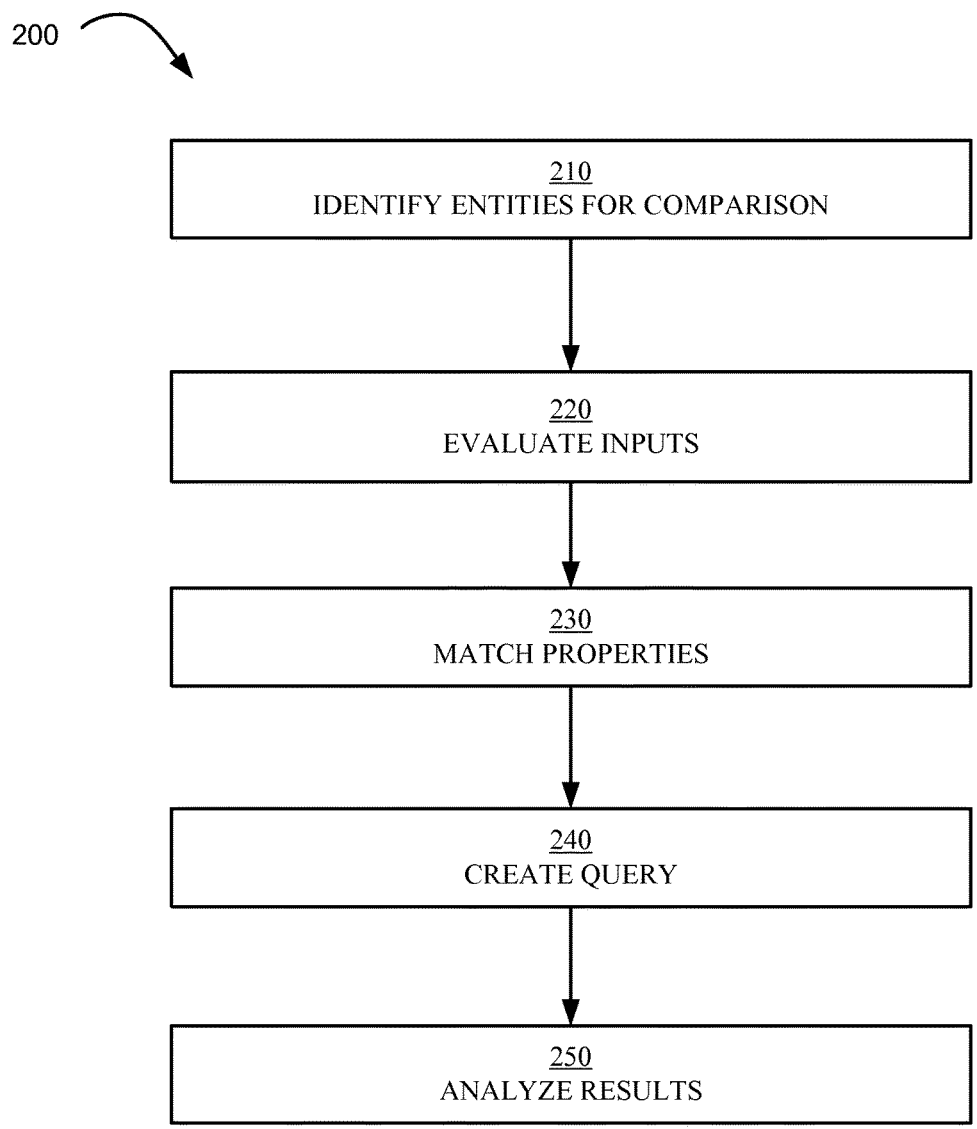
FIG. 2 illustrates a flowchart for a method to compare data in accordance with some embodiments of the present disclosure.

Referring now to FIG. 2, illustrated is a flowchart for a method to compare data in accordance with some embodiments of the present disclosure. In some embodiments, the method 200 can be implemented by one or more processors (e.g., processors 105 of FIG. 1) according to a set of instructions (e.g., instructions 160 of FIG. 1).

The method 200 can begin with operation 210 by identifying two entities for comparison. Operation 210 can comprise receiving input that identifies two selected entities, or the operation 210 can comprise an automatic identification of entities for comparison (e.g., as a result of a search). In some embodiments, operation 210 comprises receiving the respective primary keys (i.e., a set of unique identifiers) for the two entities that will be compared.

Operation 220 can evaluate the similarity of the input entities. Operation 220 can determine if the entities identified in operation 210 are two versions of the same entity or two different entities. Operation 220 can further determine if the entity has custom properties (e.g., a compound key). If so, operation 220 can populate the metadata of the aforementioned custom properties into a hashmap.

Operation 230 can match the properties of the two entities. If the two entities have the same properties, operation 230 continues to operation 240. If the two entities have different properties, operation 230 can conduct syntactic and semantic comparisons between the properties of the two entities to determine equivalencies based on syntactic and/or semantic similarities. If equivalencies are found, the method 200 can proceed to operation 240. In some embodiments, a confirmation (e.g., from an administrator) is requested to validate the identified equivalencies. In various embodiments, properties can refer to attributes, and, thus, semantic similarities between attributes can comprise attribute names that may have similar meaning while being syntactically different. For example, an attribute name {client_address} can have the same semantic meaning as {location_of_customer} despite the syntactic differences. In such as a case, operation 230 determines that the {client_address} and {location_of_customer} refer to identical data, and, as a result, can have respective attribute values compared for corresponding instances to determine additions, deletions, and/or updates to the data between the two entities. Operation 230 is described in greater detail hereinafter with respect to FIG. 3.

Operation 240 can create a query based on the information provided in operation 210, 220, and 230. The query can identify instances of the first entity that correspond to a respective instance of the second entity. The query can use set intersection techniques to identify instances that are shared between the first entity and the second entity. For example, the query can compare the primary key values of each entity to determine shared instances. In such an example, identical or equivalent primary key values can indicate corresponding instances. The query can further determine changes in attribute values of corresponding instances. In some embodiments, the query comprises a structured query language (SQL) query and the SQL query determines changes in corresponding attribute values through the use of query predicates. Thus, in some embodiments of the present disclosure, the query builder can identify the predicate associating an attribute value of a first instance of the first entity and an attribute value of a corresponding instance of the second entity. The predicate association can, in some embodiments, determine if the corresponding attribute values of the first entity and the second entity comprise no change, an addition, a deletion, or an update between the two entities. In the case of an update, the query can determine how the corresponding values are changed.

Operation 250 analyzes the results generated in operation 240. In some cases, operation 250 comprises a result set wherein each row of the result set is associated with a set of columns containing metadata describing the comparison between the two entities. Thus, operation 250 produces a user consumable output that indicates additions, deletions, or updates for one or more corresponding attribute values of one or more corresponding instances of the two entities. In some embodiments, operation 250 can parse the metadata and compile it into an output such as a table, a graphic, or another output beneficial to presenting the results to a user. In some cases, operation 250 further comprises outputting the results to an interface (e.g., I/O device 112 of FIG. 1).

Figure 3:
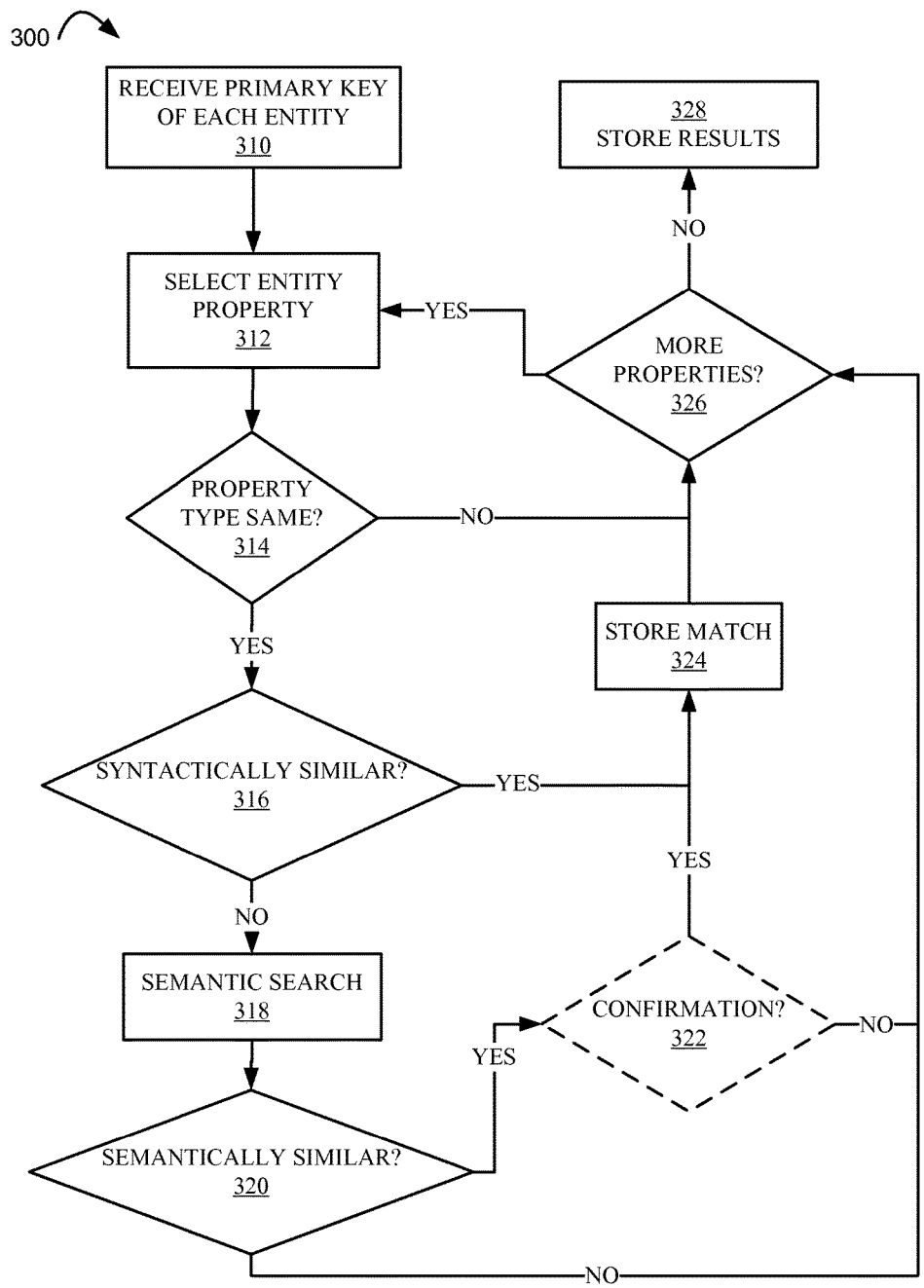
FIG. 3 illustrates a flowchart of a method to determine equivalent properties from two or more non-identical entities in accordance with some embodiments of the present disclosure.

Referring now to FIG. 3, illustrated is a flowchart of a method for determining equivalent properties from two or more non-identical entities in accordance with some embodiments of the present disclosure. In some embodiments, the method 300 can be executed by one or more processors (e.g., processors 105 of FIG. 1) executing a set of instructions (e.g., instructions 160 of FIG. 1). In some embodiments, the method 300 can be a subroutine of operation 230 of FIG. 2. Although the method 300 is applicable to any number of entities, the method 300 is described with respect to two entities in accordance with some embodiments of the present disclosure.

The method 300 can begin with operation 310 with the receipt of the primary key of each entity. In operation 312 an entity property can be selected for analysis. In some embodiments, an entity property can refer to an entity attribute. Operation 314 can determine if the selected property type of the first entity is the same property type of the second entity. In some embodiments, the property type can refer to a data type for a given property. In cases where the property is an attribute and the property type is a data type, the data type can be, but is not limited to, numeric, text, currency, and so on. If the property type is not the same, operation 314 can determine the properties are not equivalent and the method 300 can proceed to operation 326 and determine if there are more property combinations to be compared. If the property type is the same, the method 300 can continue to operation 316.

Operation 316 can determine if the syntax of each selected property is similar. If the syntactic difference is below a syntax threshold, the method 300 can proceed to operation 324 and store the match. If the syntax is not similar, the method 300 can proceed to operation 318 and conduct a semantic search.

In some embodiments, the semantic search of operation 318 includes searching one or more knowledge bases (e.g., a metadata repository) for relationships between the selected properties of the two or more entities. In some embodiments, the search uses the respective name of the property of a first entity and the respective name of the property of a second entity as subject and object in an ontological semantic search. As is understood by one skilled in the art, an ontological semantic search can represent data as triples (e.g., resource description framework (RDF) triples). The relationship between two data points can be quantified by determining the shortest path of associations that connects the two data points. For example, two data points connected by a shorter path can be more likely to have an equivalent meaning than two data points connected by a longer path. The path length can be determined by, for example, a subject-predicate-object search where the two respective properties form a subject and an object of the search. Thus, in some embodiments, the operation 320 can determine if the path connecting the two selected properties of the two entities has a distance below a semantic threshold. If the path connecting the two selected properties is not below a semantic threshold, then the method 300 can proceed to operation 326 and additional properties can be compared. If the path connecting the two properties is below the semantic threshold used in determining operation 320, then the method 300 can proceed to operation 322.

Operation 322 (shown as optional via the dashed lines) comprises a confirmation operation in which the predicted equivalence identified between the two properties of the two entities is confirmed. In some embodiments, operation 322 outputs a message to an interface and receives confirmation from the interface (e.g., I/O device 112 of FIG. 1). In embodiments where operation 322 does not occur, the semantic threshold used in determining operation 320 is considered sufficient (i.e., sufficiently probable that the two properties are, in fact, equivalent) and the method 300 proceeds to operation 324.

Operation 324 stores the match identified in operations 312 through 322. In some embodiments, the match is stored in a memory or storage (e.g., memory 125 or storage 130 of FIG. 1). Operation 326 determines if more properties of the two entities are to be compared. If so, the method 300 returns to operation 312 and loops through operations 312-326 until no more properties will be compared. If any properties are unmatched, an error message can be output to an interface (e.g., I/O device 112 of FIG. 1) indicating that one or more properties is unmatched. If no more properties are to be compared, the method 300 continues to operation 328 and stores the set of matches. Operation 328 can store the set of matches in, for example, the memory 125 or storage 130 as shown and described in FIG. 1.

Although the method 300 is shown as comparing individual pairs of properties, the method 300 can also compare sets of pairs of properties. For example, operation 314 can, in some embodiments, identify pairs of properties having similar property types. In such a case, a bi-partite matching technique can be employed to determine a set of paired properties. Similarly, operation 316 and 320 can likewise perform their respective functions over a set of combinations rather than a single combination. In some embodiments, operations 316 and 320 can also use bi-partite matching to determine a set of combinations of properties of the respective entities.

Figure 4:
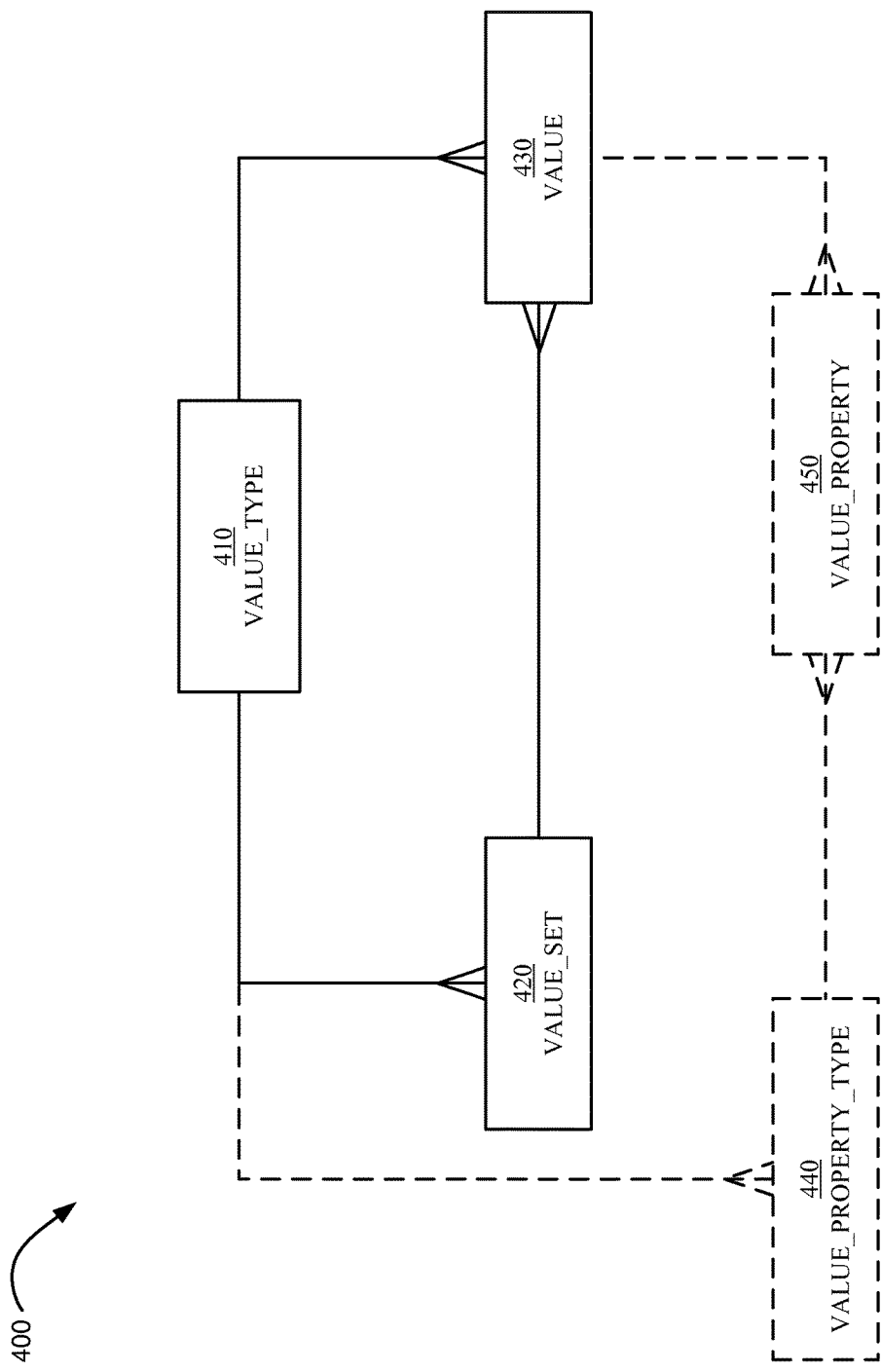
FIG. 4 illustrates a dynamic database in accordance with some embodiments of the present disclosure.

Referring now to FIG. 4, illustrated is a dynamic database in accordance with some embodiments of the present disclosure. The dynamic database 400 can contain a plurality of values 430, a plurality of sets of values (value_set) 420, and a plurality of types of values (value_type) 410. Value types 410 can exhibit a one-to-many relationship with values 430 and sets of values 420. That is to say, a plurality of value sets 420 and a plurality of values 430 can fall under a respective value type 410. Sets of values 420 can have a one-to-many relationship with values 430 such that a respective value set 420 can comprise a plurality of values 430.

In additional embodiments, the dynamic database 400 can also contain value property type (value_property_type) 440 and value property (value_property) 450. Value property type 440 and value property 450 are shown as optional via the dashed lines and are relevant to Table 2 described hereinafter. Value 430 can have a one-to-many relationship to value properties 450. Value property type 440 can also have a one to many relationship with value property 450. Value type 410 can have a one-to-many relationship with value property type 440.

Table 1 provides an example set of code useful to compare two entities that are represented by a single primary key (as opposed to a compound key). The comparison shown and described with respect to Table 1 and FIG. 4 compares value attributes, value set attributes, and child entities in accordance with a dynamic database represented by the solid lines appearing in FIG. 4.

Table 1 presents an example query as follows:

TABLE 1

Query Example for Entity Represented by Single Primary Key select distinct 'Updated', rdv1.RD_VALUE_ID, rdv2.RD_VALUE_ID, rdv1.BASEID, rdv1.RD_VALUE_NAME, rdv2.RD_VALUE_NAME rdvalue2name, rdv1.STANDARD_ID, 'Name', rdv1.RD_VALUE_NAME rdname1, rdv2.RD_VALUE_NAME rdname2 from rdvalue rdv1, rdvalue rdv2

TABLE 1-continued

Query Example for Entity Represented by Single Primary Key

```
WHERE
rdv1.RD_VALUE_SET_ID = 232739101238285629 AND (rdv1.entity_Active_Ind IS NULL
OR rdv1.entity_Active_Ind <> 0 ) AND
rdv2.RD_VALUE_SET_ID = 396238744561772527 AND (rdv2.entity_Active_Ind IS NULL
OR rdv2.entity_Active_Ind <> 0 ) AND
rdv1.standard_id = rdv2.standard_id AND
(rdv1.RD_VALUE_NAME != rdv2.RD_VALUE_NAME OR rdv1.RD_VALUE_NAME is null
or rdv2.RD_VALUE_NAME is null) AND
not( rdv1.RD_VALUE_NAME is null AND rdv2.RD_VALUE_NAME is null)
```

Thus, Table 1 presents an illustrative set of code that could be used to compare two or more entities having a set of relationships similar to those shown and described by the dynamic database 400 of FIG. 4 comprising value types 410, value sets 420, and values 430. It is to be understood that Table 1 and FIG. 4 are examples, and, thus, alternative embodiments can be similar or dissimilar to the embodiment shown and described with respect to Table 1 and FIG. 4.

Table 2 provides a set of example code for comparing values 430 between two value sets 420 being identified by a compound key. The example query provided in Table 2 represents an example using a dynamic database comprising value types 410, value sets 420, values 430, value property types 440, and value properties 450 as represented by the solid and dashed lines of FIG. 4. It is to be understood that the code shown in Table 2 is example code, and, thus, similar or dissimilar sets of code can be used in similar or dissimilar circumstances according to different embodiments of the present disclosure.

Table 2 presents an example query as follows:

TABLE 2

Query Example of Entity Represented by Compound Key

```
select distinct 'Updated', rdv1.RD_VALUE_ID, rdv2.RD_VALUE_ID, rdv1.BASEID,
rdv1.RD_VALUE_NAME, rdv2.RD_VALUE_NAME rdvalue2name, rdv1.STANDARD_ID,
'Name', rdv1.RD_VALUE_NAME rdname1, rdv2.RD_VALUE_NAME rdname2 from rdvalue
rdv1, rdvalue rdv2 , RDVALUEPROPERTY rdvp1, RDVALUEPROPERTY rdvp2,
rdvaluepropertytype rdpt
WHERE
rdv1.RD_VALUE_SET_ID = 758439057545155322 AND (rdv1.entity_Active_Ind IS NULL
OR rdv1.entity_Active_Ind <> 0 ) AND
rdv2.RD_VALUE_SET_ID = 726539057462626762 AND (rdv2.entity_Active_Ind IS NULL
OR rdv2.entity_Active_Ind <> 0 ) AND
rdpt.rd_value_type_id = 263839057451545235 AND
rdv1.standard_id = rdv2.standard_id AND
rdpt.is_key=1 AND
rdvp1.rd_val_prop_typ_id = rdpt.rd_val_prop_type_id AND
rdvp2.rd_val_prop_typ_id = rdpt.rd_val_prop_type_id AND
rdvp1.rd_value_id = rdv1.rd_value_id AND
rdvp2.rd_value_id = rdv2.rd_value_id AND
(rdvp2.entity_Active_Ind IS NULL OR rdvp2.entity_Active_Ind <> 0 ) AND
(rdpt.entity_Active_Ind IS NULL OR rdpt.entity_Active_Ind <> 0 ) AND
(rdvp1.entity_Active_Ind IS NULL OR rdvp1.entity_Active_Ind <> 0) AND
rdvp1.rd_value_prop_name = 'strcmpKey' AND
rdvp1.rd_property_val = rdvp2.rd_property_val AND
(rdv2.entity_Active_Ind IS NULL OR rdv2.entity_Active_Ind <> 0 ) AND
(rdv1.RD_VALUE_NAME != rdv2.RD_VALUE_NAME OR rdv1.RD_VALUE_NAME is null
or rdv2.RD_VALUE_NAME is null) AND
not( rdv1.RD_VALUE_NAME is null AND rdv2.RD_VALUE_NAME is null)
INTERSECT
select distinct 'Updated', rdv1.RD_VALUE_ID, rdv2.RD_VALUE_ID, rdv1.BASEID,
rdv1.RD_VALUE_NAME, rdv2.RD_VALUE_NAME rdvalue2name, rdv1.STANDARD_ID,
'Name', rdv1.RD_VALUE_NAME rdname1, rdv2.RD_VALUE_NAME rdname2 from rdvalue
rdv1, rdvalue rdv2 , RDVALUEPROPERTY rdvp1, RDVALUEPROPERTY rdvp2,
rdvaluepropertytype rdpt
WHERE
rdv1.RD_VALUE_SET_ID = 758439057545155322 AND (rdv1.entity_Active_Ind IS NULL
OR rdv1.entity_Active_Ind <> 0 ) AND
rdv2.RD_VALUE_SET_ID = 726539057462626762 AND (rdv2.entity_Active_Ind IS NULL
OR rdv2.entity_Active_Ind <> 0 ) AND
rdpt.rd_value_type_id = 263839057451545235 AND
rdv1.standard_id=rdv2.standard_id AND
rdpt.is_key=1 AND
rdvp1.rd_val_prop_typ_id = rdpt.rd_val_prop_type_id AND
rdvp2.rd_val_prop_typ_id = rdpt.rd_val_prop_type_id AND
rdvp1.rd_value_id = rdv1.rd_value_id AND
rdvp2.rd_value_id = rdv2.rd_value_id AND
rdvp1.rd_value_prop_name = 'strcmpkey' AND
rdvp1.rd_property_val = rdvp2.rd_property_val AND
(rdvp2.entity_Active_Ind IS NULL OR rdvp2.entity_Active_Ind <> 0 ) AND
(rdpt.entity_Active_Ind IS NULL OR rdpt.entity_Active_Ind <> 0 ) AND
```

TABLE 2-continued

Figure 5:
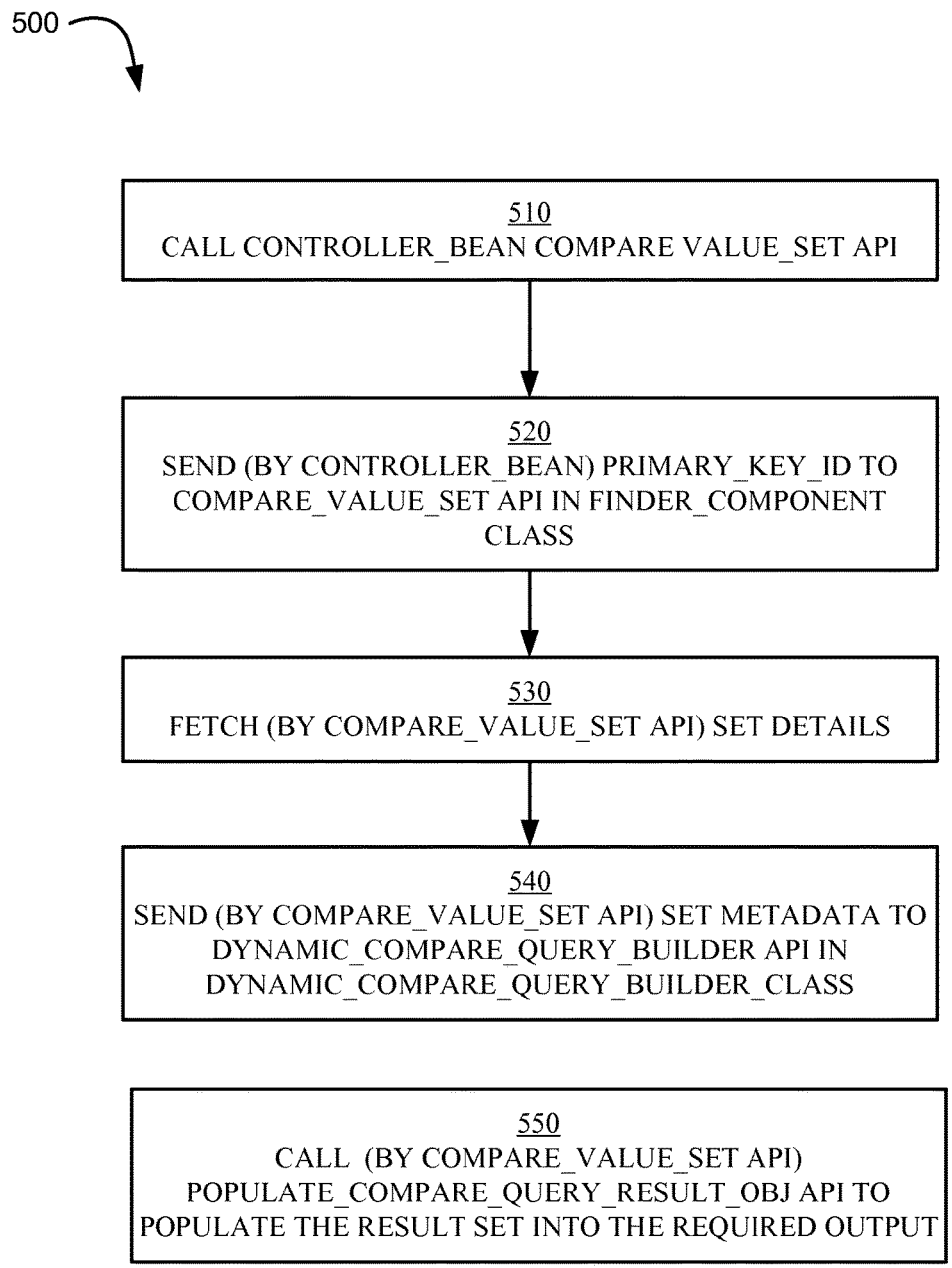
FIG. 5 illustrates a flowchart of a method to compare two entities in accordance with some embodiments of the present disclosure.

Query Example of Entity Represented by Compound Key (rdvp1.entity_Active_Ind IS NULL OR rdvp1.entity_Active_Ind <> 0) AND
(rdv2.entity_Active_Ind IS NULL OR rdv2.entity_Active_Ind <> 0 ) AND
(rdv1.RD_VALUE_DESC != rdv2.RD_VALUE_DESC OR rdv1.RD_VALUE_DESC is null or
rdv2.RD_VALUE_NAME is null) AND
not( rdv1.RD_VALUE_NAME is null AND rdv2.RD_VALUE_NAME is null)
INTERSECT Referring now to FIG. 5, illustrated is a flowchart of a method to compare two entities in accordance with some embodiments of the present disclosure. The method 500 can be implemented by one or more processors (e.g., processors 105 of FIG. 1) executing a set of instructions (e.g., instructions 160 of FIG. 1). Aspects of FIG. 5 refer to generic programs, classes, and application program interfaces (APIs). It should be understood that these generic aspects are not limiting, and further, that additional aspects, fewer aspects, or different aspects are possible while remaining within the spirit and scope of the present disclosure.

The method 500 can begin with operation 510 by calling a controller_bean's compare_value_set API to compare two value_set entities. The controller_bean can refer to, for example, a serializable java bean having a nullary constructor and allowing access to properties using getter and setter methods. The compare_value_set API can refer to an API with instructions embodied therewith to retrieve data associated with selected entities. In some embodiments, operation 510 is the same or substantially the same as operation 210 of FIG. 2.

In operation 520, the controller_bean can send each primary_key_id to the compare_value_set API in a finder_component class. In various embodiments, the primary_key_id comprises a primary key which can be a simple key or a compound key. In some embodiments, the finder_component class can provide an execution template for the compare_value_set API. In operation 530, the compare_value_set API can fetch entity details associated with the primary_key_ids. In some embodiments, the compare_value_set API also identifies syntactically and/or semantically equivalent attributes, elements, and/or properties of the respective sets. In some embodiments, operation 530 is the same or substantially the same as operation 230 of FIG. 2.

In operation 540, the compare_value_set API can send the fetched metadata to dynamic_compare_query_builder API in a dynamic_compare_query_builder class. In some embodiments, the dynamic_compare_query_builder class provides an execution template for the dynamice_compare_query_builder API. In various embodiments, the dynamic_compare_query_builder API creates and executes a query to locate added, deleted, and/or updated changes between the entities associated with the input primary_key_ids. In various embodiments, the dynamic_compare_query_builder API uses set intersection and query predicate searches to identify additions, deletions, and/or updates between the respective sets of metadata. In such cases, the "select" clause of the query can extract updated fields, added fields, and deleted fields separately. In additional embodiments, the query can compare the current entities as well as all child entities in the entity hierarchy. In some embodiments, operation 540 can be the same or substantially the same as operation 240 of FIG. 2.

In operation 550, the compare_value_set API can call the populate_compare_query_result_obj API in a dynamic_compare_query_result_set_processor class to populate the result set into a user consumable output. In some embodiments, the dynamic_compare_query_result_set_processor class provides an execution template for the populate_compare_query_result_obj API. In some embodiments, the populate_compare_query_result_obj API can generate a user consumable data object having numerous rows wherein each row can represent a single attribute and each column can represent the changes associated with the respective attributes. In some embodiments, operation 550 can be the same or substantially the same as operation 250 of FIG. 2.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
receiving a first entity and a second entity;
wherein the first entity and the second entity each comprise a respective set of data stored in a database;
wherein the first entity and the second entity each comprise at least one respective primary key and at least one respective attribute;
wherein the first entity and the second entity comprise at least one pair of corresponding instances;
wherein each respective instance comprises a respective primary key value and at least one respective attribute value;
performing a semantic search to identify a match of at least one respective attribute of the first entity to a respective equivalent attribute of the second entity or at least one attribute value difference between the at least one pair of corresponding instances, wherein performing the semantic search comprises:
executing a subject-predicate-object query based on resource description framework (RDF) triples on one or more data resources, wherein the subject-predicate-object query is formed with the at least one respective attribute of the first entity as a subject and the respective equivalent attribute of the second entity as an object of the subject-predicate-object query; and returning a match result of at least two selected attribute values or the at least one attribute value difference in response to the execution of the subject-predicate-object query, wherein a path length which connects the at least two selected attribute values is below a semantic threshold; and producing a user consumable output that indicates the match result or the at least one attribute value difference identified in response to the semantic search.

2. The method of claim 1, further comprising:
determining that the at least one respective attribute of the first entity and the respective equivalent attribute of the second entity comprise a syntactic difference below a syntactic threshold.

3. The method of claim 1, wherein the user consumable output identifies at least one change between at least one attribute value of at least one instance of the first entity and a corresponding attribute value of a corresponding instance of the second entity.

4. The method of claim 1, wherein the primary key comprises a compound key, wherein the compound key comprises a first name field and a last name field.

5. The method of claim 1, wherein the primary key comprises a single field uniquely identifying respective pieces of data, wherein the single field comprises a social security number.

6. The method of claim 1, wherein respective attributes are associated with a property type, wherein a first property type comprises a numeric property, wherein a second property type comprises a text property, wherein a third property type comprises a currency property.

7. The method of claim 6, wherein the method is performed by a serializable Java bean having a nullary constructor and allowing access to attribute values using getter and setter methods.

8. A system comprising:
a memory storing a database, the database comprising a plurality of entities, each entity associated with a primary key and at least one attribute, wherein a first entity of the plurality of entities and a second entity of the plurality of entities comprise at least one pair of corresponding instances, wherein each instance comprises a unique primary key value and at least one attribute value;

an interface configured to receive one or more inputs and display one or more outputs;

a processing unit communicatively coupled to the memory and the interface and configured to: retrieve at least the first entity and the second entity from the memory;

perform a semantic search to identify a match of at least one respective attribute of the first entity to a respective equivalent attribute of the second entity or at least one attribute value difference between the at least one pair of corresponding instances, wherein performing the semantic search comprises:

executing a subject-predicate-object query based on resource description framework (RDF) triples on one or more data resources, wherein the subject-predicate-object query is formed with the at least one respective attribute of the first entity as a subject and the respective equivalent attribute of the second entity as an object of the subject-predicate-object query; and returning a match result of at least two selected attribute values or the at least one attribute value difference in response to the execution of the subject-predicate-object query, wherein a path length which connects the at least two selected attribute values is below a semantic threshold; and produce a user consumable output that indicates the match result or the at least one attribute value difference identified in response to the semantic search.

9. The system of claim 8, wherein the processing unit is further configured to:
determine that the at least one respective attribute of the first entity and the respective equivalent attribute of the second entity comprise identical attributes.

10. The system of claim 8, wherein the processing unit is further configured to identify the at least one pair of corresponding instances based on an intersection of the set of instances of the first entity and the set of instances of the second entity.

11. A computer program product comprising a computer readable storage medium having program instructions embodied therewith, the program instructions executable by a processor to cause the processor to:

retrieve a first set of data and a second set of data, wherein each set of data comprises a plurality of instances, wherein each instance comprises a respective identifier value and at least one respective attribute value, wherein each respective attribute value corresponds to a respective attribute type and a respective identifier, wherein the first set of data and the second set of data comprise at least one pair of corresponding instances;

performing a semantic search to identify a match of at least one respective attribute type of the first set of data to a respective equivalent attribute type of the second set of data or at least one attribute value difference between the at least one pair of corresponding instances, wherein performing the semantic search comprises:

executing a subject-predicate-object query based on resource description framework (RDF) triples on one or more data resources, wherein the subject-predicate-object query is formed with the at least one respective attribute type of the first set of data as a subject and the respective equivalent attribute type of the second set of data as an object of the subject-predicate-object query; and returning a match result of at least two selected attribute values or the at least one attribute value difference in response to the execution of the subject-predicate-object query, wherein a path length which connects the at least two selected attribute values is below a semantic threshold; and compile a user consumable output that indicates the match result or the at least one attribute value difference identified in response to the semantic search.

12. The computer program product of claim 11, wherein the first set of data and the second set of data are respective portions of a dynamic database.

* * * * *